Jan. 27, 1970 R. A. WAYNE 3,492,518
MAGNETIC-ELECTRIC PICKUP FOR TOOTHED WHEELS AND THE LIKE
Filed Feb. 11, 1966

INVENTOR.
ROBERT A. WAYNE
BY
Richard MacCutcheon
ATTORNEY

United States Patent Office 3,492,518
Patented Jan. 27, 1970

3,492,518
MAGNETIC-ELECTRIC PICKUP FOR TOOTHED WHEELS AND THE LIKE
Robert A. Wayne, East Cleveland, Ohio, assignor to Avtron Manufacturing Inc., Cleveland, Ohio, a corporation of Ohio
Filed Feb. 11, 1966, Ser. No. 526,774
Int. Cl. H02k 21/38
U.S. Cl. 310—155     3 Claims

ABSTRACT OF THE DISCLOSURE

For a toothed rotor type electric impulse generator, a pickup unit has an axially magnetized permanent magnet which is a hollow shell, a pickup coil which is coaxial with and located within the magnet, and a soft iron rod which is located principally within the coil.

BACKGROUND AND DESCRIPTION

The present invention relates to a magnetic-electric pickup, e.g., of the type useful for determining the speed of an associate relatively rotatable toothed wheel, or as a proximity switch, or as a gas engine ignition distributor.

Electric impulse generators having a toothed rotor and at least one relatively stationary assembly of a permanent magnet, a coil about the magnet, and a soft iron flux return path around the coil, are well known in the art, but prior difficulties have included those of cost (e.g., of the permanent magnet and wire coil and return path material) and of size (magnetic pickups available heretofore having a construction which even prevents their use in many applications, where space is critical).

An object of the present invention is to provide simple and inexpensive means for overcoming the above mentioned difficulties.

As compared with prior art arrangements of (a) rotating magnets, (b) rotating coils, (c) surrounding a stationary magnet with a pickup coil and surrounding the coil with a soft iron return path, (d) having center and outer return paths with a magnet on top, or (e) using bar magnets, or (f) surrounding a portion of the rotor with pickup coil means and then surrounding such a complicated assembly with a permanent magnet, the present invention, in brief, proposes a small, stationary central rod as a flux return path, a pickup coil about said rod, and a cylindrical permanent magnet about said coil. Thus with the greatest economy of materials and space, which is only in part due to the large circumference of the magnet allowing it to be relatively thin, there is provided an efficient, relatively powerful magnetic pickup.

Other objects and advantages will become apparent and the invention may be better understood from consideration of the following description taken in connection with the accompanying drawing, in which.

Figure 1:
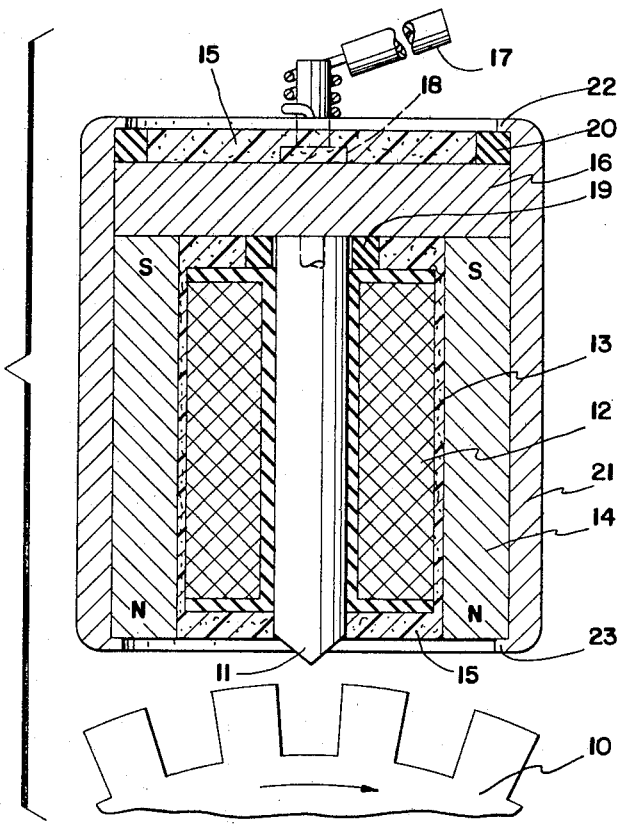
FIG. 1 is a part axial section of a generator embodying the invention.
Figure 2:
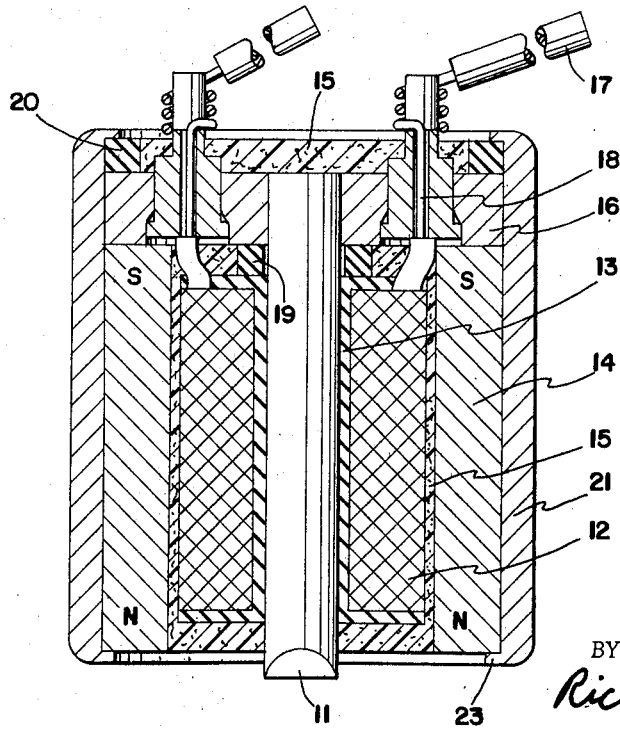
FIG. 2 is an axial section taken at 90° to the showing of FIG. 1, but with FIG. 2, for simplicity eliminating the toothed rotor.

As illustrated a toothed e.g., soft iron wheel 10 is arranged in co-operative relationship with a relatively stationary magnetic pickup assembly comprising a soft iron probe rod 11, a coil 12 arranged, as on a nylon bobbin 13, about the central rod 11, and an outwardly cylindrical permanent magnet 14 used as a shell about the coil. There may also be a potting compound 15 at appropriate places both above and beneath a soft iron top return path member 16 extending from magnet 14 to center rod 11. As illustrated, there are also connection wires 17, approximately insulated terminals 18, spacer washers 19, 20 and a non-magnetic, e.g., aluminum, outer shell 21 which holds the device together after the material is swaged at its ends 22–23.

Preferably, and as shown in FIG. 1, the soft magnetic material (probe) rod 11 is attenuated or thinned to a point at its end adjacent to, and in a direction parallel to a tangent to, the periphery of the rotatable toothed wheel 10.

In operation, when the magnetic material of the teeth of wheel 10 are brought in proximity with the center rod 11 the magnetic reluctance of the path from center rod to magnet 14 is reduced causing an increase in flux carried by the rod, thus causing a voltage to be induced in the coil 12, and, vice versa, a voltage of opposite polarity is induced as magnetic material is removed from proximity with the pickup, the frequency of the resultant A.C. voltage being a direct function of the number of teeth on the wheel 10 and its speed of rotation, while the necessary parts (as illustrated the stationary parts) take up less space than heretofore (e.g., with a diameter of only 13/16" overall) and, being smaller, cost less than heretofore even with pulse output amplitudes as great as before.

While I have illustrated and described a particular embodiment, various modifications may obviously be made both as to function (e.g., just which parts of the assembly rotate) and structure (e.g., just where the coil is located), for I intend to have the invention defined only by the appended claims taken with all reasonable equivalents insofar as the prior art permits.

I claim:

1. In a relatively stationary speed transducer device for use with a rotatable member of the type having equally spaced teeth about the periphery thereof, and where size, cost and efficiency of said stationary device is important, the combination of:
   a permanent magnet which is a tubular shell polarized in the direction of its axis,
   a pickup coil which is coaxial with said permanent magnet shell and located therewithin, and
   a return path comprising a soft magnetic material rod portion which is coaxial with said permanent magnet shell and also coaxial with said coil, and which is located within said coil, and which has an end arranged for co-operation with teeth of the rotatable member.

2. In a relatively stationary speed transducer device as in claim 1, the further characterization of:
   the soft magnetic material rod portion end which is arranged for co-operation with teeth of the rotatable member being in the form of a point which faces said teeth, said point thinning the material of said rod portion end in at least one direction which direction is parallel to a tangent to the periphery of the rotatable member.

3. In a relatively stationary speed transducer device for use with a rotatable member of the type having equally spaced teeth about its periphery, the combination of claim 1 further characterized by
   an outer sleeve of non-magnetic material, said sleeve having a tubular portion which is coaxial with and radially surrounds the tubular permanent magnet.

References Cited

UNITED STATES PATENTS

| | | | |
|---|---|---|---|
| 3,130,332 | 4/1964 | Zehfeld et al. | 310—15 |
| 3,417,268 | 12/1968 | Lace | 310—27 |
| 2,669,669 | 2/1954 | Spaulding | 310—155 |
| 3,252,024 | 5/1966 | Loudon | 310—155 |

DAVID X. SLINEY, Primary Examiner

U.S. Cl. X.R.
310—168